United States Patent [19]
Anthony

[11] 4,449,391
[45] May 22, 1984

[54] METHOD FOR SEPARATING CLOSED BOLLS OF COTTON BY MATURITY

[75] Inventor: William S. Anthony, Stoneville, Miss.

[73] Assignee: The United States of America as represented by the Secretary of Agriculture, Washington, D.C.

[21] Appl. No.: 385,162

[22] Filed: Jun. 4, 1982

[51] Int. Cl.[3] .......................... G01N 9/10; G01N 9/36
[52] U.S. Cl. ...................................... 73/32 R; 73/437
[58] Field of Search ........................ 73/32 R, 433, 437

[56] References Cited

FOREIGN PATENT DOCUMENTS 167584 2/1906 Fed. Rep. of Germany ..... 73/32 R

OTHER PUBLICATIONS

"A New Maturity Test of Peas" by Jodidi from the "Journal of the Franklin Institute", vol. 223, No. 5, pp. 593-607, May 1937.
"Measurement of the Density of Hide and Leather" by Witnauer et al. from The Journal of the American Leather Chemists Ass'n., vol. LIX, No. 12, Dec. 1964.

*Primary Examiner*—James J. Gill
*Attorney, Agent, or Firm*—M. Howard Silverstein; David G. McConnell; Raymond C. Von Bodungen

[57] ABSTRACT

A method for separating/classifying closed bolls of a given variety of cotton by maturity is disclosed. Harvested, unopened cotton bolls are immersed in a series of solutions having a specific gravity of less than one. The bolls of cotton are thus identified and separated by means of the different specific gravity readings. The specific gravity readings are correlated with the moisture content of the bolls and subsequently the maturity dates of the cotton. Additional steps for cleaning, washing and drying are provided as needed. Alcohol/water solutions are utilized to prepare solutions with specific gravities of 0.8379 to 0.9455.

8 Claims, No Drawings

METHOD FOR SEPARATING CLOSED BOLLS OF COTTON BY MATURITY

BACKGROUND OF THE INVENTION (1) Field of the Invention

This invention relates to a method of separating closed bolls of cotton. More specifically, this method is for separating closed cotton bolls into different levels of maturity by means of specific gravity of the boll.

(2) Description of the Prior Art

Cotton dust has been a major problem in the cotton industry for several years. Numerous efforts have been devoted to solving the problem of dust in cotton gins as well as in textile processing operations. Cotton-related dust is suspected of causing a respiratory disorder (Byssinosis) in some individuals, but research has failed to identify a causative agent. A proposed method of identifying the causative agent has been to harvest large quantities of uncontaminated cotton. The uncontaminated cotton has been harvested in the closed-boll form in the field before it had opened and suffered weathering effects. Procurement of large quantities of lint cotton have been hampered by the inability of current technology to provide a means to separate the closed bolls of cotton by differences in maturity. Boll size is not directly related to boll maturity and thus can not be used as a means of separation. Previous researchers have found that about 40% of the bolls that were harvested in the field were immature and had to be discarded after they were conditioned and dried and had failed to open.

At present, the physical size of the boll, the color of the boll, and the location of the boll on the plant are used to estimate maturity. These factors, however, provide only a 60% efficiency.

After the closed bolls are dried and conditioned and have opened, the immature bolls can be discarded. However, no technology exists to allow separation of the somewhat opened or opened bolls into discreet levels of maturity. Maturity is directly related to micronaire and the cotton industry presently assigns no discounts to micronaire values of 3.5 to 4.9. Lint cotton having a higher or lower micronaire, however, is discounted.

SUMMARY OF THE INVENTION

The present invention provides a method for separating closed bolls of cotton into discreet levels of maturity after the bolls are harvested from the plant, but before they are conditioned and dried. This method will increase the efficiency of the boll selection process significantly. It is the unique feature of this invention to utilize the fact that the specific gravity of each closed boll decreases as the maturity of the boll increases. Thus, the separation of the closed bolls after harvest, as a function of specific gravity also separates the bolls into different levels of maturity. Selective separation of the closed bolls in liquid solutions having densities of less than 1 isolates the individual bolls into different levels of maturity. Thus, correlating the specific gravity readings of the unopened bolls of cotton with the moisture content of the bolls and subsequently translating the moisture content into known maturity dates of the cotton bolls can be relied upon as an accurate method for classifing unopened cotton bolls.

DESCRIPTION OF THE PREFERRED EMBODIMENTS

This invention deals with one of the major problems of closed-boll cotton concept, that is, cotton bolls are produced throughout a long growing season. Past experience has shown that the highest seed germination level is from 42-day-old bolls whereas fiber maturity is established somewhat eariler. If unopened bolls are to be harvested from presently used varieties, they should be between 40 and 50 days old to have acceptable fiber and seed maturity. Bolls begin to open after 50 days of age under most cultural and environmental conditions, and current closed-boll harvesting equipment removes all of the bolls from the cotton plant at one time with a finger-stripper or brush-stripper. Therefore, some of the bolls are extremely immature (less than 10 days old) while some of the bolls are fully mature or opened if the bolls are transported directly to the gin after harvesting. Therefore, the closed bolls are separated from the plant parts and opened bolls. It is the separation of closed bolls of cotton by maturity with which this invention deals. This separation cannot be done manually because maturity is not closely correlated to boll size, shape or color. Since the size of a cotton boll increases exponentially during the first 10 days after anthesis and reaches maximum at about 25 days and since the weight of the seed cotton in the boll increases exponentially during the first 10 days after anthesis and reaches a maximum at about 25 days, there is a critical and limiting time frame in which to harvest the optimum closed cotton boll.

Therefore, the following general classification of harvested closed cotton bolls was made:

Artifically dry and separate the closed bolls into well-opened, moderately opened and unopened categories. About 40% of the bolls were in the unopened category. Micronaire readings for the well-opened and unopened bolls were taken and recorded at $3.6\pm0.5$ and $2.8\pm0.4$ respectively. Thus, the artifically opened bolls were separated into categories of maturity based upon the degree of opening.

However, the closed bolls presented a different problem. It is the discovery of this invention that micronaire correlates well with boll moisture content. Therefore, separation of maturity of closed bolls can be accomplished by accurately measuring the moisture content. Since the specific gravity of the closed boll is a direct function of the maturity of the boll, then classification by means of specific gravity measurement is possible. This is valid because the moisture content of the boll changes rapidly as it matures while the boll size developes early and remains relatively constant. Very immature bolls are comprised of over 90% water. As the boll begins to mature the moisture content of the boll decreases until such time that it reaches about 60% and begins to open. Once the boll begins to open, the lint and seed begin to equilibrate with the existing environmental conditions and the moisture content of the seed and lint fiber drops rapidly. The following examples of the preferred embodiments show the validity of the inventive concepts claimed herein.

EXAMPLE 1

The specific gravity of individual closed bolls of known age was measured as follows.

White blooms were tagged on three separate occasions-July 16, 24, and 30, 1980 for four varieties of cotton-Stoneville 213, Coker 420, Deltapine 61 (DPL 61), and DES 56. Bolls were harvested at three ages-27, 33, and 41 days. After the bract, peduncle and calyx were removed, the specific gravity of each boll was determined by Archimedes' principle. Since the specific gravity of closed bolls is less than 1, they float in water. To compensate for this problem, a 50 g brass sinker-weight was attached to the boll and caused the boll to submerge in water (Black and Little, 1956). The specific gravity was then calculated from the following equation:

$$\text{Specific gravity} = W_o/(W_1 - W_2)$$

where $W_o$ = Initial boll weight, g, $W_1$ = Boll weight plus sinker weight (submerged in water), g, and $W_2$ = Boll weight (sumberged in water) plus sinker weight (submerged in water), g.

Each boll was also assigned a specific gravity level as defined in Example 2. The bolls were then opened by hand and dried at 38° C. for 48 h.

Example 1 was conducted in a completely random design with three replications and two factors-variety (four levesl) and age (three levels). Analysis of variance was performed for seven dependent variables: initial weight, moisture content, specific gravity, major diameter, minor diameter, length, and specific gravity level. Micronaire readings were determined from the combined lint fiber for the three replications. Analysis of variance was conducted at the 5% level of probability and Duncan's multiple range test (DMRT) was used to separate the means where necessary. Physical dimensions were measured with micrometers.

RESULTS AND ANALYSIS OF EXAMPLE 1

Values for the dependent variables in the study are given in Table 1. Means for the moisture content of the bolls were 67.16, 72.54, and 75.37 percent, respectively for boll ages of 41, 33, and 27 days. The moisture content of the closed bolls decreased as the age of the boll increased. Specific gravities for boll ages of 41, 33, and 27 days were 0.9045, 0.9309, and 0.9351, respectively (Table 1).

Variety as a source of variation was significant for all dependent variables (Table 2). Boll age significantly affected moisture content, length and specific gravity. Interactions between variety and boll age were not significant for the dependent variables.

Since the specific gravity and moisture content were significantly affected by varieties and boll ages, the specific gravity separation for maturity technique should only be used within a variety. This is further substantiated by the micronaire readings shown in Table 1. Separation of the varietal means indicated that the specific gravity of Stoneville 213 was not different from that of DPL 61. In addition, the specific gravity of Coker 420 was not different from the specific gravity of DES 56. Although the levels of specific gravity required for accurate separation of closed bolls as a function of maturity differ, the same levels may be used for several varieties without a significant loss of precision.

Results of Example 1 suggest that the major diameter are primarily a function of boll variety, but not of boll age. The boll length dimensions were a function of variety and boll age as well as the interaction between variety and boll age. Consequently, boll size is not a good estimate of boll maturity. Initial boll weights were significantly different for the varieties, but not for the boll ages, thus, varietal differences must be considered in any separation system.

TABLE 1

MEANS FOR THE DEPENDENT VARIABLES FOR EXAMPLE 1[1]

| Variety | Tag Date 1980 | Boll age, days | Initial Weight, Grams | Moisture Content, Percent | Major Diameter, cm | Minor Diameter, cm | Length, cm | Specific Gravity Level | Specific Gravity | Micronaire Reading |
|---|---|---|---|---|---|---|---|---|---|---|
| Stoneville | 7-16 | 41 | 11.71 | 68.87 | 2.76 | 2.64 | 3.48 | 7.3 | 0.9109 | 4.2 |
| 213 | 7-24 | 33 | 14.85 | 72.58 | 3.00 | 2.90 | 3.72 | 5.0 | 0.9500 | 3.8 |
| | 7-30 | 27 | 14.14 | 75.15 | 3.00 | 2.90 | 3.00 | 5.0 | 0.9571 | 2.8 |
| Mean | | | 13.57 a | 72.20 a | 2.92 a | 2.81 a | 3.40 a | 5.8 a | 0.9393 a | 3.6 a |
| Coker 420 | 7-16 | 41 | 17.21 | 67.20 | 3.09 | 3.00 | 4.30 | 7.0 | 0.9030 | 4.2 |
| | 7-24 | 33 | 18.97 | 72.55 | 3.31 | 3.05 | 4.06 | 6.3 | 0.9262 | 3.2 |
| | 7-30 | 27 | 20.48 | 76.65 | 3.35 | 3.23 | 4.41 | 7.0 | 0.9180 | 2.5 |
| Mean | | | 18.89 b | 72.13 a | 3.25 b | 3.10 b | 4.26 b | 6.8 b | 0.9157 b | 3.3 a |
| DPL 61 | 7-16 | 41 | 17.07 | 66.12 | 3.52 | 3.16 | 4.53 | 6.0 | 0.9344 | 5.5 |
| | 7-24 | 33 | 15.63 | 70.61 | 3.82 | 2.86 | 3.01 | 4.7 | 0.9405 | 3.7 |
| | 7-30 | 27 | 13.58 | 72.10 | 2.92 | 2.70 | 3.67 | 4.7 | 0.9568 | 3.2 |
| Mean | | | 15.43 a | 69.61 b | 3.41 bc | 2.91 a | 3.74 c | 5.1 c | 0.9439 a | 4.1 b |
| DES 56 | 7-16 | 41 | 11.44 | 66.44 | 3.18 | 2.69 | 3.09 | 9.0 | 0.8698 | 4.6 |
| | 7-24 | 33 | 12.80 | 74.41 | 2.91 | 2.76 | 3.44 | 7.7 | 0.9070 | 3.0 |
| | 7-30 | 27 | 12.05 | 77.58 | 2.88 | 2.63 | 3.57 | 6.7 | 0.9085 | 2.6 |
| Mean | | | 12.10 ac | 72.81 a | 2.99 d | 2.69 a | 3.36 a | 7.8 d | 0.8951 b | 3.4 a |

[1]Harvested from field 5 at the Delta Branch Experiment Station, Stoneville, MS on August 25, 1980. Means within each column not followed by the same lower-case letter were significantly different at the 5% level of probability as judged by Duncan's multiple range test.

TABLE 2

ANALYSIS OF VARIANCE FOR THE DEPENDENT VARIABLES IN EXAMPLE 1

| Source | Degree of Freedom | MEAN SQUARES FOR Initial Weight | Moisture Content | Major Diameter | Minor Diameter | Length | Specific Gravity |
|---|---|---|---|---|---|---|---|
| Variety (A) | 3 | 77.39[1] | 18.10[1] | 0.09[1] | 0.07[1] | 0.19[1] | 0.005[1] |
| Boll Age (B) | 2 | 4.38[2] | 208.96[1] | .03[2] | 0.01[2] | 0.12[1] | 0.003[1] |
| A × B | 6 | 7.44[2] | 5.46[2] | .03[2] | 0.02[2] | 0.08[1] | 0.001[2] |

TABLE 2-continued

ANALYSIS OF VARIANCE FOR THE DEPENDENT VARIABLES IN EXAMPLE 1

| Source | Degree of Freedom | MEAN SQUARES FOR Initial Weight | Moisture Content | Major Diameter | Minor Diameter | Length | Specific Gravity |
|---|---|---|---|---|---|---|---|
| Error | 24 | 11.40 | 6.00 | .01 | .02 | .03 | 0.001 |

[1]Indicates significance at the 5% level of probability.
[2]Indicates non-significance at the 5% level of probability.

EXAMPLE 2

The following flotation method was used to separate bolls into increments based on their specific gravity; premixed solutions of liquids with different specific gravities were used to divide bolls into several different groups:

Methanol and water were mixed in varying quantities to obtain 11 distinctly different specific gravities. The specific gravities (at 25° C.) used ranged from 0.7840 which is the specific gravity of the undiluted methanol to 0.9970 which is the specific gravity of the undiluted distilled water. The specific gravities of the solutions were as follows:

| Specific Gravity Level | Specific Gravity |
|---|---|
| 1 | 0.9970 |
| 2 | 0.9782 |
| 3 | 0.9564 |
| 4 | 0.9346 |
| 5 | 0.9128 |
| 6 | 0.8910 |
| 7 | 0.8692 |
| 8 | 0.8479 |
| 9 | 0.8266 |
| 10 | 0.8038 |
| 11 | 0.7840 |

Specific gravity of each solution was monitored periodically with a hydrometer and methanol was added when necessary.

One hundred closed cotton bolls of unknown ages were harvested from four varieties and two field locations on four separate harvest dates. All of the bolls were removed from randomly selected plants. The peduncles, bracts and calyx were carefully removed in the laboratory. Each boll was then dropped sequentially into the premixed solutions beginning with the highest specific gravity level, level 1. Surface moisture was removed from each boll with a paper towel before the boll was dropped into each solution. When a boll failed to float, it was classified as having a specific gravity midway between that of the two solutions. The bolls were then cracked open and dried in a laboratory oven at 38° C. for 48 hours. The identity of the bolls by specific gravity level, variety, field location and harvest date was maintained throughout the process. After the bolls were dried to a moisture content of about 10%, the cotton was removed from the burr by hand and ginned on a small gin. The lint fiber was then conditioned for 24 hours at 21° C. and 65% relative humidity, and divided into 3.24 g-subsamples to obtain the micronaire reading. The micronaire was measured with a Sheffield Micronaire instrument.

Data were then analyzed as a randomized complete block, split plot experimental design with field locations as blocks. Four varieties, four harvest dates, six levels of specific gravity, and two locations were used. Insufficient numbers of bolls were separated in specific gravity levels 1, 2, 3, 10, and 11 to allow them to be included in the analyses. Consequently, bolls that were separated in specific gravity levels 4, 5, 6, 7, 8, and 9 were used. Means were separated where necessary with DMRT at the 5% level of probability. The only dependent variable used was micronaire.

RESULTS AND ANALYSIS OF EXAMPLE 2

Values of micronaire as a function of specific gravity for each variety and location are shown in Table 3. Means of the micronaire reading for all varieties and field growing locations increased progressively from 3.02 to 4.33 for specific gravity levels of 0.9455 to 0.8379 respectively. Since mean values for micronaire increased progressively as the specific gravity decreased, closed cotton bolls can be separated by differences in the specific gravities of the bolls.

Analysis of variance for micronaire was performed for the data as a split plot, randomized complete block design. Since subunit error terms were not significantly different from the whole unit error terms, the error terms were pooled. Analysis of variance was subsequently performed as a randomized complete block, factorial design. The effect of variety and specific gravity on micronaire was significant at 1% level of probability. Harvest date was not significant. DMRT for varieties indicated the following significance:

| Variety | Micronaire |
|---|---|
| DPL 61 | 4.03 a |
| Stoneville 213 | 3.70 b |
| Coker 420 | 3.23 c |
| DES 56 | 3.19 c |

The levels of specific gravity of 0.9455, 0.9327, and 0.9019 did not produce significantly different levels of micronaire as shown below:

| Specific gravity | Micronaire |
|---|---|
| 0.8379 | 4.33 a |
| 0.8592 | 4.02 b |
| 0.8801 | 3.57 c |
| 0.9019 | 3.23 d |
| 0.9237 | 3.03 d |
| 0.9455 | 3.02 d |

Thus, the number of levels of specific gravity could be reduced to four.

Micronaire readings for the interaction between varieties and harvest dates were significant (Table 4). This suggests that the rate of maturity differs for the varieties since micronaire is an estimate of maturity. Micronaire readings for the interaction between variety and specific gravity were also significant. The significant interaction indicates that micronaire readings from the closed bolls separated by the same levels of specific gravity differ with varieties. Consequently, in order to precisely separate closed bolls by maturity, different levels of specific gravity must be used for different varieties. Lack of significance between the means for the micronaire reading for Coker 420 and DES 56 suggests that some varieties can be separated with the same levels of specific gravity. The interaction between variety, harvest date and specific gravity was significant. The interaction contributed a comparatively small amount to the mean squares and has little practical significance.

The coefficient of variability was 13.5% which suggests an acceptable degree of variability within the data.

Cotton grown in location 2 produced higher micronaire readings than did the cotton grown in location 1 for nearly all levels of specific gravity (Table 3). The only exception was the Stonevill 213 variety at a specific gravity level of 0.8379. Mean values for micronaire for locations 1 and 2 were 3.42 and 3.67, respectively.

Some immature bolls were separated into the levels of specific gravity that yielded relatively mature bolls. Apparently, the relationship between specific gravity and maturity is somewhat hyperbolic in that the same specific gravity level exists early and late in the development of the external boll size and the high moisture content of the undeveloped seed and fiber within the boll that is present at that time. The seed and lint continue to grow and mature long after the boll size has reached its maximum.

The cotton marketing industry currently uses values of micronaire from 3.50 to 4.90 without assessing a discount. With this in mind, closed bolls with a specific gravity of about 0.88 should produce lint fiber with a micronaire value 3.5 or above (Table 3). Further analysis of Table 3 suggests that this is also true for the mean for all varieties; however, each variety has a different relationship between specific gravity and micronaire.

Analysis of variance (Table 4) indicated that the micronaire was significantly different for varieties, locations, and levels of specific gravity. Differences due to specific gravity were highly desirable. Differences due to variety and location, however, support the conclusion that each variety and growing location require a slightly different level of specific gravity to separate closed bolls strictly as a function of a given micronaire reading. The data do suggest that generalized divisions between levels of micronaire can be achieved simply by a flotation method that separates the bolls as a function of their specific gravity.

TABLE 3

MICRONAIRE AS A FUNCTION OF VARIETY, FIELD LOCATION & SPECIFIC GRAVITY EXAMPLE 2

| Variety | Location[1] | Micronaire for specific gravity 0.9455 | 0.9237 | 0.9019 | 0.8801 | 0.8592 | 0.8379 |
|---|---|---|---|---|---|---|---|
| Stoneville 213 | 1 | 3.00 | 3.08 | 2.98 | 3.72 | 4.28 | 4.54 |
| Stoneville 213 | 2 | 3.16 | 3.05 | 3.94 | 3.90 | 4.76 | 4.21 |
| Coker 420 | 1 | 2.98 | 3.12 | 2.72 | 2.88 | 3.38 | 3.84 |
| Coker 420 | 2 | 2.72 | 2.59 | 2.98 | 3.27 | 4.04 | 4.23 |
| DPL 61 | 1 | 3.32 | 3.35 | 3.88 | 4.40 | 4.06 | 4.67 |
| DPL 61 | 2 | 3.32 | 3.52 | 4.15 | 4.43 | 4.55 | 4.83 |
| DES 56 | 1 | 2.78 | 2.86 | 2.58 | 2.73 | 3.24 | 3.82 |
| DES 56 | 2 | 3.02 | 2.97 | 2.67 | 3.25 | 3.88 | 4.63 |
| Mean[2] | — | 3.02 a | 3.04 a | 3.24 a | 3.57 b | 4.02 c | 4.33 d |

[1]Locations 1 and 2 were fields 1 and 9, respectively, at the Delta Branch Experiment Station, Stoneville, MS.
[2]Means not followed by the same lower case letter were significantly different at the 5% level of probability as judged by Duncan's multiple range test.

TABLE 4

ANALYSIS OF VARIANCE FOR THE MICRONAIRE VALUES FOR EXAMPLE 2

| Source of Variation | Degrees of Freedon | Sum of Squares | F-Value | Probability of Greater F |
|---|---|---|---|---|
| Variety (V) | 3 | 23.10 | 33.72 | 0.0001[1] |
| Harvest date (H) | 3 | 1.65 | 2.41 | 0.0705[3] |
| Specific gravity (S) | 5 | 47.03 | 41.19 | 0.0001[1] |
| V × H | 9 | 12.00 | 5.84 | 0.0001[1] |
| V × S | 15 | 6.96 | 2.03 | 0.0205[2] |
| H × S | 15 | 2.44 | 0.71 | 0.7680[3] |
| V × H × S | 45 | 16.28 | 1.58 | 0.0311[2] |
| Replication | 2 | 2.81 | 12.30 | 0.0007[1] |
| Error | 95 | 21.69 | | |

[1]Indicates significance at the 1% level.
[2]Indicates significance at the 5% level.
[3]Indicates lack of significance at the 5% level of probability.

EXAMPLE 3

Cotton bolls were grown under irrigated conditions, and separated into increments based on their specific gravity with the same flotation technique as in Example 2 since bolls used in Examples 1 and 2 were produced on plants in non-irrigated fields.

The primary purpose of Example 3 was to establish the relationship between specific gravity and maturity for bolls produced under irrigated conditions in one growing location and from one variety of cotton. White blooms on cotton plants from variety DES 56 were tagged on Aug. 6, 1980. Twenty-five of the tagged bolls were harvested on each day for Sept. 4, 11, and 17, 1980. The bracts, peduncles and calyx were removed by hand and the specific gravity was determined with the flotation method described in Example 2. Data was analyzed using a one-way analysis of variance with three levels of age (29, 36, and 42 days) and 25 replications. The analysis was performed for three dependent variables-initial weight, specific gravity level, and moisture content. Means were separated with DMRT at the 5% level of probability.

RESULTS AND ANALYSIS OF EXAMPLE 3

Means and the analyses of variance for the initial weight, specific gravity level, and moisture content are given in Table 5 for the data collected in Example 3. The mean moisture content for the bolls harvested at 29, 36, and 42 days of age was 70.51%. The moisture content was significantly different for boll ages and was 75.09, 69.37, and 67.08% for ages 29, 36, and 42 days, respectively. Specific gravity levels were also significantly affected by boll age. The specific gravity levels followed the same pattern as did the moisture content values. Specific gravity levels were 6.84, 7.76, and 9.12, respectively, for ages 29, 36, and 42 days. The analysis suggests that for a particular variety of cotton grown in a particular field under irrigated growing conditions, the specific gravity method may be used to separate closed bolls into maturity groups on the basis of moisture content.

TABLE 5

ANALYSES OF VARIANCE AND MEANS FOR INITIAL WEIGHT, SPECIFIC GRAVITY LEVEL, AND MOISTURE CONTENT FOR EXAMPLE 3

| Source of Variation[2] | MEANS AND MEAN SQUARES FOR | | | | | |
|---|---|---|---|---|---|---|
| | Initial Weight | | Specific Gravity Level | | Moisture Content | |
| | Mean[3] | Mean Squares | Mean[3] | Mean Squares | Mean[3] | Mean Squares |
| Boll Age | 16.91 | 55.22[1] | 7.91 | 32.89[1] | 70.51 | 425.83[1] |
| 29 Days | 16.30a | | 6.84a | | 74.09a | |
| 36 Days | 18.61b | | 7.76b | | 69.37b | |
| 42 Days | 15.83a | | 9.12c | | 67.08c | |
| Error | | 7.44 | | 1.90 | | 8.27 |

[1]Significant at the 5% level of probability.
[2]Degrees of freedom were 2 and 72, respectively, for boll age and error.
[3]Values not followed by the same lower-case letter were significantly different at the 5% level of probability as judged by Duncan's multiple range test.

SUMMARY AND CONCLUSIONS OF RESULTS

Emphasis on the procurement of closed bolls to provide clean cotton necessitated a method for separating closed bolls into different maturity classes. Since the moisture content of closed bolls correlates with the maturity of the fiber and seed, separation of closed bolls based on their specific gravity is demonstrated.

In Example 1 the specific gravity, physical dimensions, moisture content and micronaire were established for four varieties. In Example 2 all the bolls from selected plants of four varieties and two field locations were harvested and separated with solutions of known specific gravity. In Example 3, the effect of soil irrigation on the specific gravity and maturity of closed bolls was considered.

Results show conclusively that cotton bolls can be separated by specific gravity into discrete levels of maturity of micronaire. These micronaire levels are a function of variety. However, if resolution is sacrificed somewhat and the micronaire increments are appropriately selected, then the method is acceptable. For example, if specific gravity levels of 0.95, 0.90, 0.88, and 0.84 are used to separate closed bolls, micronaire readings should be less than 2.3, 3.1±0.4, 3.6±0.6, and 4.2±0.5, respectively. These levels are valid for at least four varieties and two growing conditions. In order to obtain greater resolution, the specific gravity method of separation must be modified somewhat for each variety of cotton.

It should be understood that the invention should not be limited to the means of obtaining the specific gravity of the flotation solutions in the example given (the addition of methanol to water). Any means can be used which will produce the same desired result.

I claim:

1. A method for separating or classifying closed bolls of a given variety of cotton by maturity comprising:
(a) receiving unopened cotton bolls harvested from an agricultural field;
(b) immersing said bolls of cotton in a series of solutions, said solutions having a specific gravity of less than one, and thus separating said bolls by means of the differences in the specific gravity readings;
(c) correlating said specific gravity readings with moisture content of the bolls and subsequently translating said moisture content into known maturity dates of said cotton bolls.

2. The method of claim 1 including a step of removing the bract, stem and calyx from the unopened bolls prior to immersing into the solutions.

3. The method of claim 2 including a step of washing in water the unopened bolls of cotton after removing the bract, stem and calyx to remove the foreign matter.

4. The method of claim 3 wherein the solutions with specific gravities of less than one are prepared with methanol and water.

5. The method of claim 4 wherein the specific gravities are selected from the group of solutions having specific gravities of: 0.8379; 0.8592; 0.8801; 0.9019; 0.9237; 0.9455.

6. The method of claim 5 wherein all of the cotton bolls are of the same variety of cotton.

7. The method of claim 6 wherein the cotton bolls are harvested from a crop of cotton grown by means of irrigation.

8. The method of claim 7 including the steps of:
(a) partially opening the bolls of cotton after step (c) of claim 1;
(b) drying the partially opened bolls to a moisture content to about 10%;
(c) removing lint from said dried bolls separated by each specific gravity solution;
(d) determining a standard micronaire measurement of said bolls; and
(e) using said micronaire measurement to classify said cotton lint.

* * * * *